W. R. CLARK.
Improvement in Bee Hives.
No. 120,624.                              Patented Nov. 7, 1871.
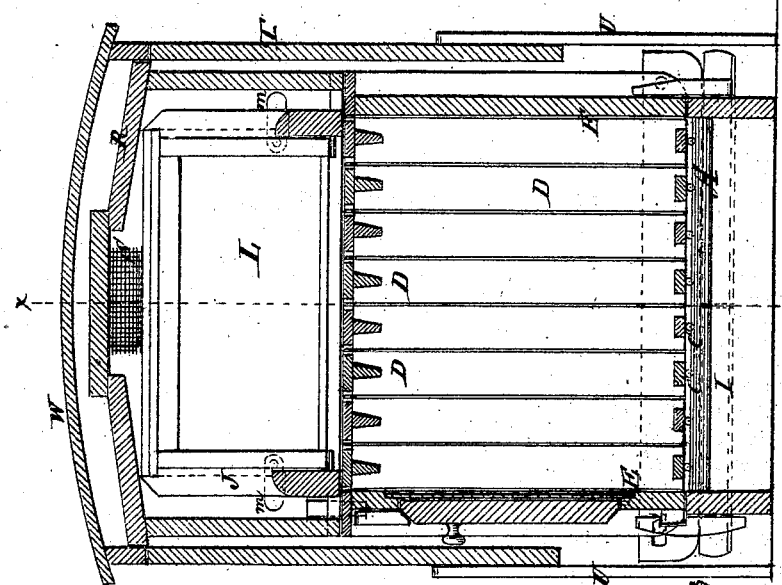
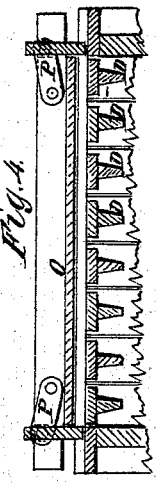
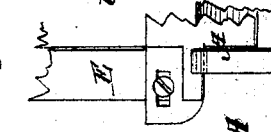
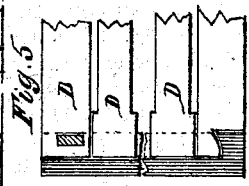
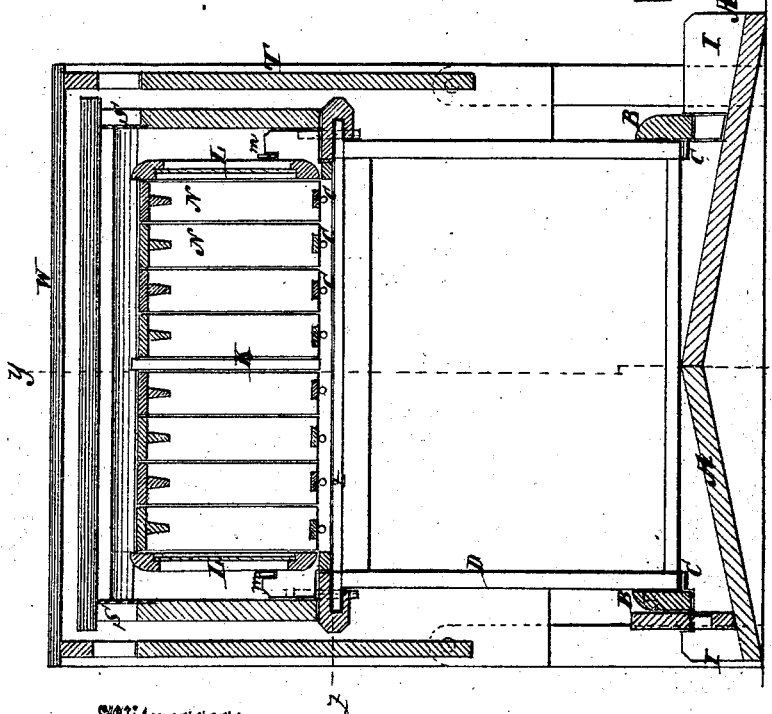
Witnesses:
Francis McArdle.
Warren B. Pike.
Inventor:
W. R. Clark.
Per
Attorneys.

UNITED STATES PATENT OFFICE.

WILLIAM R. CLARK, OF PIQUA, OHIO.

IMPROVEMENT IN BEE-HIVES.

Specification forming part of Letters Patent No. 120,624, dated November 7, 1871.

*To all whom it may concern:*

Be it known that I, WILLIAM R. CLARK, of Piqua, in the county of Miami and State of Ohio, have invented a new and useful Improvement in Bee-Hives; and I do hereby declare that the following is a full, clear, and exact description thereof, which will enable others skilled in the art to make and use the same, reference being had to the accompanying drawing forming a part of this specification.

This invention relates to new and useful improvements in bee-hives; and consists in the construction, arrangement, and combination of parts as hereinafter described.

In the accompanying drawing, Figure 1 is a vertical section of the hive, taken on the line $xx$ of Fig. 2. Fig. 2 is a vertical section taken on the line $yy$ of Fig. 1. Fig. 3 is a detail of Fig. 2 on line $xx$. Fig. 4 is a detail of Fig. 1 on the line $yy$. Fig. 5 is a broken section of Fig. 1 on the line $zz$. Fig. 6 is a section of the outside of Fig. 2 at the base of the hive.

Similar letters of reference indicate corresponding parts.

A is the base of the hive. B is a bar upon each side, resting in slots in the base, in which are pins C, upon which the honey sections D rest, as seen in Figs. 1 and 2. The sections D are held in proper position by corner pieces E, connected together by the rails F and by the removable bars H, the latter being held by a dovetail at one end and by a key at the other. The corner pieces and the rails and bars referred to form a crate which is provided with two glass sides, covered by removable shutters, by means of which the interior of the hive may be inspected. The bee-entrances I I are provided with ventilating shutters or slides, which may be removed at pleasure. The hive is divided into two sections or honey-chambers, the lower one having been already described. J is the upper crate or honey-section chamber, having a vertical partition, K, in its middle connected with the side rails and two glass frames, L L, connected with the rails J by bottoms $m$. N represents the honey section in the upper chamber. This upper crate or chamber rests upon the top of the lower one, and the bees may pass from one to the other. The sides of the lower honey sections and the sides of the upper sections are in close contact with each other, so that the chambers are completely closed at these points. Until the lower chamber is filled the upper chamber may be removed, and when so removed the shallow box O is placed over the lower chamber. This box has two adjustable sides which are connected with the fixed sides by the hinge plates P, which allows the sides to be raised and adjusted as may be required for purposes of ventilation. R is a cap, which covers the upper chamber, with ventilators S S therein, as seen in Fig. 1. T is an outer casing with adjustable legs U, and with one of its sides hinged at the top, so that it can be raised or turned up from one of the glass sides of the crates for inspecting the interior and observing the condition and operation of the bees. W is the top or cap of the casing. This outer casing or protector by virtue of its adjustable legs is made to rest in winter upon the platform or base of the hive, so as to be a protection to the bees in winter or in cold weather. In summer it is raised upon its legs, thus allowing the air to freely circulate around the crates.

Having thus described my invention, what I claim as new, and desire to secure by Letters Patent, is—

1. The base A, the bars B fitting in slots thereof and having pins C thereon, the two sides E F G, and the two removable horizontal bars H combined to hold the honey sections D, as described.

2. The frame W T having pivoted legs U, combined with a two-part hive, as and for the purpose specified.

WILLIAM R. CLARK.

Witnesses:
S. S. McKINNEY,
J. WARD HALL.

(9)